May 28, 1963 M. R. SCHROEDER 3,091,665

AUTOCORRELATION VOCODER EQUALIZER

Filed June 3, 1960 3 Sheets-Sheet 1

INVENTOR
M. R. SCHROEDER
BY A. E. Hirsch Jr.
ATTORNEY

AUTOCORRELATION VOCODER EQUALIZER

Filed June 3, 1960 3 Sheets-Sheet 2

INVENTOR
M. R. SCHROEDER
BY A. E. Hirsch Jr.
ATTORNEY

INVENTOR
M. R. SCHROEDER
BY A. E. Hirsch Jr.
ATTORNEY

United States Patent Office 3,091,665

Patented May 28, 1963

3,091,665

AUTOCORRELATION VOCODER EQUALIZER

Manfred R. Schroeder, Gillette, N.J., assignor to Bell Telephone Laboratories, Incorporated, New York, N.Y., a corporation of New York Filed June 3, 1960, Ser. No. 33,741
5 Claims. (Cl. 179—15.55)

Figure 1A:
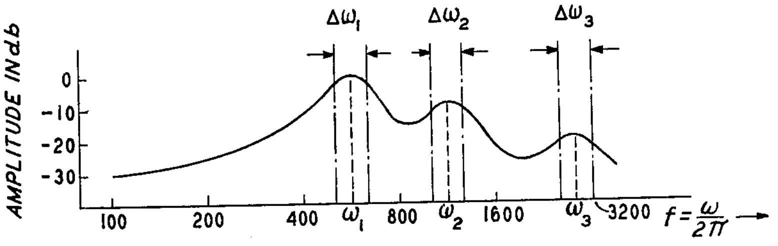

This invention relates to the narrow-band transmission of speech, and in particular to autocorrelation vocoder systems for the transmission of speech.

An autocorrelation vocoder system transmits the information content of a wide-band speech wave over a narrow-band channel by obtaining at the vocoder analyzer terminal a group of low-frequency control signals representative of the speech autocorrelation function. After transmission to the vocoder synthesizer terminal, the control signals adjust the magnitude of an excitation signal to form an artificial speech wave. Among the various autocorrelation vocoder systems that have been proposed is that described by B. Howland, B. A. Basore, R. M. Fano, and J. B. Wiesner in Quarterly Progress Reports, Research Laboratory of Electronics, M.I.T. (October 15, 1951, p. 43).

An inherent source of distortion in artificial speech produced by autocorrelation vocoder systems is the squaring of the speech amplitude spectrum inseparably associated with the derivation of the autocorrelation function of the incoming speech wave. Raising the speech amplitude spectrum to the second power changes its shape and by so doing distorts the speech reproduced by autocorrelation vocoders in at least two significant respects: fluctuations in intensity from one sound to the next are exaggerated, giving the artifical speech an unnatural "bouncy" quality; and the characteristics of most sounds are muffled or changed, impairing the intelligibility of these sounds in the artificial speech.

The present invention eliminates the distortion due to spectrum squaring by equalizing the incoming speech wave before applying it to an autocorrelation vocoder. The incoming speech wave is first separated into its component formants. The formants, which represent peaks in the amplitude spectra of voiced sounds, are individually equalized by dividing each formant by the square root of its average absolute amplitude. The individually equalized formants are then combined to form an equalized speech wave input for an autocorrelation vocoder. As derived by an autocorrelation vocoder, the autocorrelation function of the equalized speech wave has an amplitude spectrum that is of the same shape as the amplitude spectrum of the original speech wave. Thus an autocorrelation vocoder preceded by the equalizing apparatus of this invention produces artificial speech that is free of the distortion due to squaring of the speech amplitude spectrum.

The equalizing apparatus of this invention may be readily adjusted to equalize an incoming speech wave whose amplitude spectrum is to be raised to a power greater than two during the course of transmission. The equalizing apparatus is adjusted in accordance with the explicit relationship shown to exist between the power to which the amplitude spectrum is to be raised and the root of the formant amplitude by which each formant is to be divided. An incoming speech wave that is appropriately equalized in accordance with this explicit relationship may be transmitted without spectral distortion despite a number of increases in the exponent of the amplitude spectrum of the transmitted wave.

Figure 2:
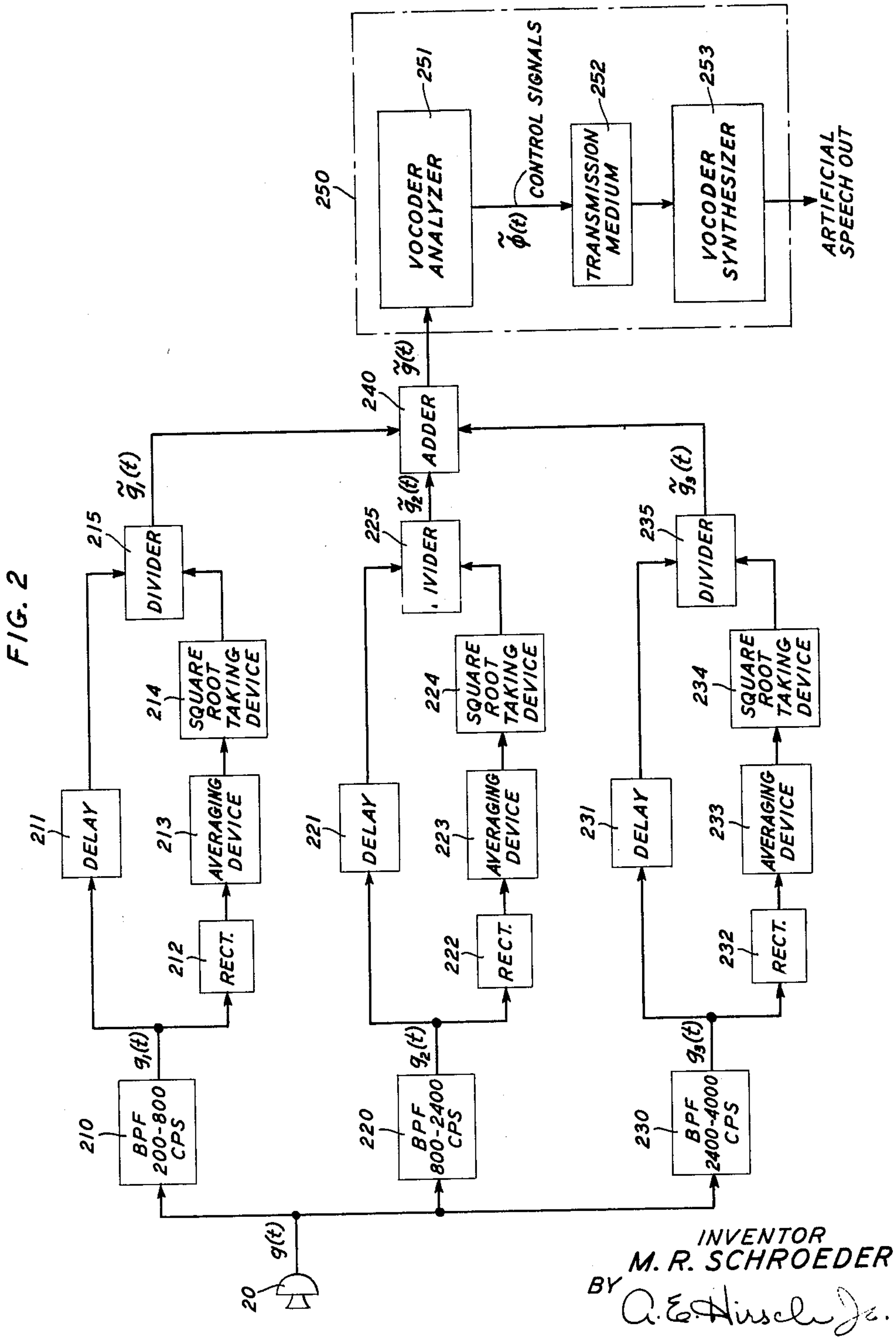
Figure 3:
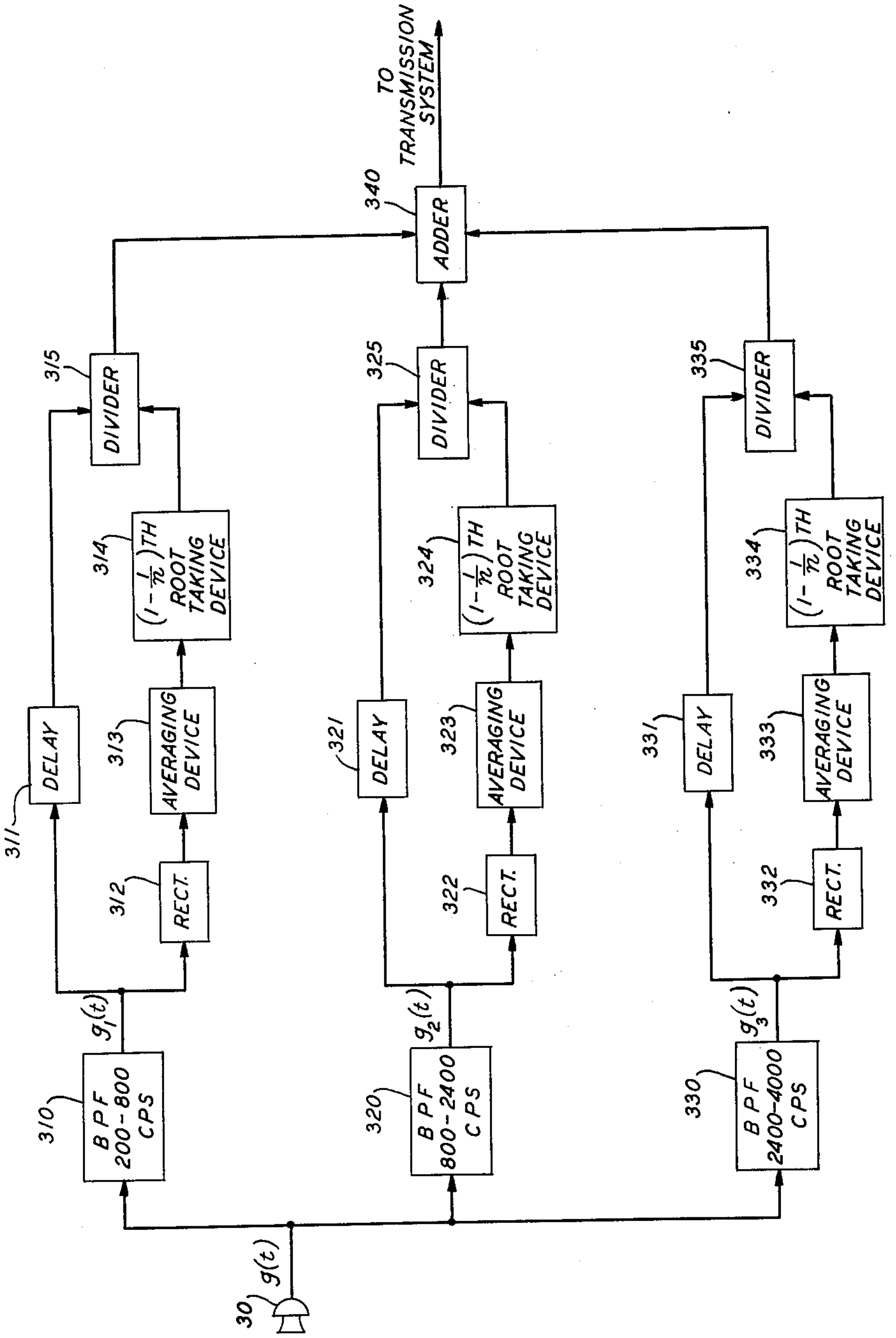

The invention will be fully apprehended from the following detailed description of illustrative embodiments thereof taken in connection with the appended drawings, in which:

FIGS. 1A, 1B, 1C, 1D, and 1E are waveform diagrams of assistance in explaining the operation of the apparatus of this invention;

FIG. 2 is a schematic block diagram showing apparatus for equalizing an incoming speech wave before applying it to an autocorrelation vocoder; and FIG. 3 is a schematic block diagram showing apparatus for equalizing an incoming speech wave before applying it to a transmission system in which the speech amplitude spectrum is to be raised to a power $n$.

*Mathematical Foundations*

A periodic speech wave $g(t)$ with period T may be expanded in a Fourier series $$g(t)=\sum_k G_k(f)\cos(k\omega t+\Psi_k),\ \omega=\frac{2\pi}{T} \qquad (1)$$

where the coefficient $G_k(f)$ constitute the amplitude spectrum of $g(t)$. The autocorrelation function *of* $g(t)$ obtained, for example, in an autocorrelation vocoder, is defined as $$\varphi(t)\equiv\frac{1}{T}\int_0^T g(x)\cdot g(x+t)dx \qquad (2)$$

and, from Wiener's theorem, the autocorrelation function may also be expanded in a Fourier series $$\varphi(t)=\sum_k G_k^2(f)\cos(k\omega t) \qquad (3)$$

It is noted from a comparison of Equations 1 and 3 that the amplitude spectrum of the autocorrelation function is the square of the amplitude spectrum of $g(t)$ and that the phases $\Psi_k$ of the original speech wave have all become zero in the speech autocorrelation function. The above equations are applicable to aperiodic waves as well as to periodic waves.

Figure 1B:
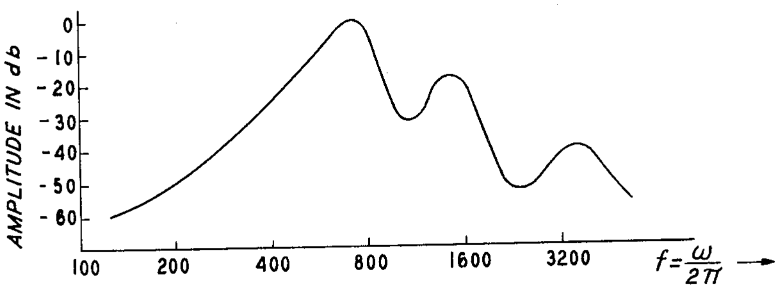

Referring now to FIG. 1A, there is shown in this curve the amplitude spectrum of a typical voiced sound. It is noted that the envelope of the spectrum contains three distinct peaks or formants. FIG. 1B, on the other hand, shows the amplitude spectrum of the speech autocorrelation function. It is observed in FIG. 1B that the squaring of the amplitude spectrum as given in Equation 3 produces a doubling, in decibels, of the amplitude differences between formants, thereby suppressing the relatively small formants.

Figure 1C:
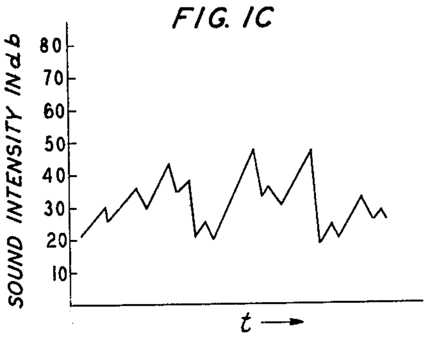
Figure 1D:
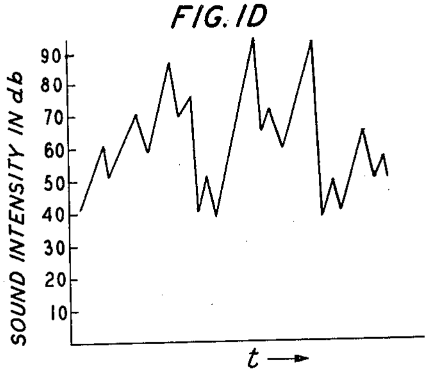

FIGS. 1C and 1D show dynamic speech level fluctuations, or the variation of total sound intensity with time, of an incoming speech wave and its autocorrelation function, respectively. Since the total sound intensity at a given instant in time is composed of the intensities of the individual formants at that instant, squaring the amplitude spectrum also doubles, in decibels, the magnitude of the total sound intensity at every point in time. As shown in FIGS. 1C and 1D, doubling the magnitude of the total sound intensity exaggerates the differences between adjacent sound intensities.

It is well known that the information content of a speech wave may be extracted by separating the wave into its formant frequency ranges and by obtaining a signal representative of each formant; for example, see the resonance vocoder described in H. W. Dudley Patent 2,243,527, issued May 27, 1941. Symbolically, the separation of a speech wave into its formant components may be expressed as $$g(t)=\sum_i g_i(t) \qquad (4)$$

Figure 1E:
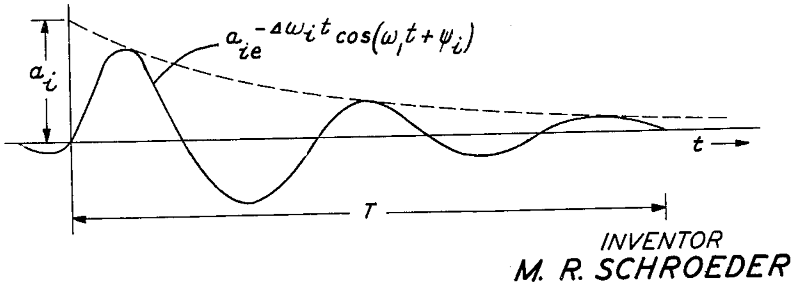

A single period T of an idealized formant component, such as shown in FIG. 1E is denoted by $$g_i(t)=a_i e^{-\Delta\omega_i t}\cos(\omega_i t+\Psi_i),\ 0\leqslant t\leqslant T \qquad (5)$$

where $a_i$ is the formant amplitude, $\Delta\omega_i$ is the the formant bandwidth, $\omega_i$ is the formant frequency, and $\Psi_i$ is the corresponding phase. As illustrated in FIG. 1E, the period T of $g_i(t)$ is assumed to be long compared to $$\frac{1}{\Delta\omega_i}$$

in order to produce substantial damping of $g_i(t)$ as $t \to T$.

In order to offset the amplitude spectrum squaring inherent in the autocorrelation function representation of speech, as shown, for example, in Equation 3, the speech wave of Equation 4 is equalized before correlating it with itself. This is done by dividing each formant component by the square root of its average absolution amplitude, that is, $$\tilde{g}(t)=\sum_i \frac{g_i(t)}{\overline{|g_i(t)|}^{\frac{1}{2}}} \qquad (6)$$

$$=\sum_i \tilde{g}_i(t) \qquad (6a)$$

where $\tilde{g}(t)$ is the equalized speech wave and $g_i(t)$ is the $i$th equalized formant component.

In order to evaluate the expression $$\overline{|g_i(t)|}^{\frac{1}{2}}$$

appearing in the denominator of Equation 6, it may be assumed that $\Delta\omega_i << \omega_i$; the justification for this assumption is shown graphically in FIG. 1A. Then for a single period T, the average absolute amplitude of the $i$th formant is $$\overline{|g_i(t)|}=a_i\cdot\overline{|e^{-\Delta\omega_i t}|}\cdot\overline{|\cos(\omega_i t+\Psi_i)|}$$

$$=a_i\cdot\frac{1}{T}\cdot\frac{1}{\Delta\omega_i}\cdot\frac{2}{\pi}$$

$$=\frac{2}{\pi\cdot T}\cdot\frac{a_i}{\Delta\omega_i} \qquad (7)$$

and its square root is $$\overline{|g_i(t)|}^{\frac{1}{2}}=\sqrt{\frac{2}{\pi\cdot T}\cdot\frac{a_i}{\Delta\omega_i}} \qquad (8)$$

Substituting (5) and (8) into (6), the equalized speech wave becomes $$\tilde{g}(t)=\sum_i \sqrt{\frac{\pi\cdot T}{2}\cdot a_i\cdot\Delta\omega_i}\, e^{-\Delta\omega_i t}\cos(\omega_i t+\Psi_i) \qquad (9)$$

The effects of equalizing an incoming speech are observed by examining the autocorrelation function of the equalized speech wave of Equation 9. The autocorrelation function may be obtained, for example, in an autocorrelation vocoder. From Equation 2, the autocorrelation function of the equalized speech wave is defined as $$\tilde{\varphi}(t)\equiv\frac{1}{T}\int_0^T \tilde{g}(x)\cdot\tilde{g}(x+t)dx \qquad (10)$$

Substituting (6a) into (10), $$\tilde{\varphi}(t)\equiv\frac{1}{T}\int_0^T\left(\sum_i \tilde{g}_i(x)\cdot\tilde{g}_i(x+t)\right)dx$$

$$=\sum_i \frac{1}{T}\int_0^T \tilde{g}_i(x)\cdot\tilde{g}_i(x+t)dx \qquad (11)$$

$$=\sum_i \tilde{\varphi}_i(t) \qquad (12)$$

Performing the integration indicated in Equation 11 produces the following expression for the autocorrelation function of the equalized $i$th formant:

$$\tilde{\varphi}_i(t)=\frac{\pi}{8}a_i e^{-\Delta\omega_i|t|}\cos\omega_i t \qquad (13)$$

Substituting Equation 13 into Equation 12, the autocorrelation function of the equalized speceh wave becomes $$\tilde{\varphi}(t)=\frac{\pi}{8}\sum_i a_i e^{-\Delta\omega_i|t|}\cos\omega_i t \qquad (13a)$$

Then for a single period T, the average absolute amplitude of the $i$th autocorrelation function of Equation 13 is $$\overline{|\varphi_i(t)|}=\frac{\pi}{8}a_i\left(\frac{1}{T}\cdot\frac{1}{\Delta\omega_i}\right)\cdot\left(\frac{2}{\pi}\right)$$

$$=\frac{1}{4T}\cdot\frac{a_i}{\Delta\omega_i} \qquad (14)$$

Comparing Equations 7 and 14, it is apparent that the average absolute amplitude of both $g_i(t)$ and $\tilde{\varphi}_i(t)$ depend upon $a_i$ and $\Delta\omega_i$ in exactly the same fashion. This means that the relative formant amplitudes of the original speech wave are correctly reproduced in the autocorrelation function of the equalized speech wave. Equally important, it also means that the relative sound intensities of the original speech wave are correctly reproduced in the autocorrelation function of the equalized speech wave, since the total sound intensity at a given instant is equal to the sum of the formant intensities at that instant. The amplitude spectrum squaring distortion inherent in the autocorrelation function representation of speech is thus eliminated by equalizing an incoming speech wave before applying the wave to an autocorrelation vocoder.

Equalization of an incoming speech wave as set forth in this invention may be easily extended to situations in which the speech amplitude spectrum is raised to powers greater than two, for example, in systems where speech is transmitted by several autocorrelation vocoders connected in tandem.

In Equation 9, the exponent of the amplitude of the $i$th equalized formant is equal to $1-x$, where, from Equation 6, $x=\frac{1}{2}$ is the root of the $i$th formant amplitude $$\overline{|g_i(t)|}$$

by which the $i$th formant is divided. In obtaining the autocorrelation function of the equalized speech wave, the exponent of the amplitude of the autocorrelation function of the $i$th equalized formant is raised to $2(1-x)$; see Equation 13a. By assumption, $2(1-x)$ must equal unity in order to prevent spectral distortion, that is, $$2(1-x)=1 \qquad (15)$$

hence the root of the denominator of Equation 6 must be $$x=\frac{1}{2} \qquad (16)$$

which was correctly provided, as evidenced by Equations 13 and 14.

To generalize Equation 15, suppose that in the course of transmission the amplitude spectrum of the transmitted wave is to be raised to a power $n$. To prevent spectral distortion, the amplitude of the $i$th formant must be equalized so that $$n(1-x)=1 \qquad (17)$$

hence the root of the average absolute amplitude by which each formant is to be divided is $$x=1-\frac{1}{n} \qquad (18)$$

For example, suppose that during transmission the amplitude spectrum of the transmitted wave is raised to the $n=5$ power. Then in order to prevent spectral distortion, the incoming speech wave is equalized before transmisson by dividing each of its formants by the $x=\frac{4}{5}$ root of its average absolute amplitude.

Referring now to FIG. 2, a preferred embodiment of this invention is illustrated therein for equalizing the speech wave input of an autocorrelation vocoder to prevent distortion due to squaring of the speech amplitude spectrum. The signal paths in FIG. 2, as well as in FIG. 3, are shown by single lines merely in order to avoid unnecessary complexity. It will be obvious to those skilled in the art at what points one or more wire paths or other complete circuits may be required to practice this invention. An incoming speech wave $g(t)$ from source 20, for example, a conventional microphone, is applied in parallel to band-pass filters 210, 220, 230. Each of these filters is proportioned to pass that band of frequencies within which one of the formants of a typical human voice characteristically appears. Thus filter 210 passes the band of frequencies from 200 to 800 cycles per second within which the first formant characteristically appears, filter 220 passes the band of frequencies from 800 to 2,400 cycles per second within which the second formant characteristically appears, and filter 230 passes the band of frequencies 2,400 to 4,000 cycles per second within which the third formant characteristically appears. It is to be understood, however, that the incoming speech wave may be divided into more than three frequency bands in order to take into account overlapping formant frequency ranges.

The formant signal appearing at the output terminal of each band-pass filter is applied to two parallel subpaths, an upper subpath and a lower subpath. Each of the lower subpaths contains a full-wave rectifier, 212, 222, 232, an averaging device, 213, 223, 233, and a square-root-taking device, 214, 224, 234, respectively, connected in tandem. These elements, which may be of any well-known construction, perform the operations required to derive a signal proportional to the denominator of Equation 6. Specifically, the square-root-taking device in each of the lower subpaths may be any one of a number of conventional circuits for generating an output voltage which is the square root of the input voltage. An example of a suitable circuit is illustrated in W. J. Karplus and W. W. Soroka, Analog Methods, page 80 (2d ed., 1959). Thus, for example, formant signal $g_1(t)$ passed by filter 210 is rectified, averaged, and rooted by elements 212, 213, 214 to form a signal proportional to $$\overline{|g_1(t)|}^{\frac{1}{2}}$$

Each of the upper subpaths contains a delay element, 211, 221, 231, respectively, of any desired construction, the amount of delay being adjusted to synchronize the formant signal passing through each upper subpath with the signal developed by the corresponding lower subpath. The amount of delay is determined by the time delay of the averaging device in each of the lower subpaths, the value of which is on the order of 50 milliseconds.

The output terminals of each pair of upper and lower subpaths are connected to the input terminals of dividers 215, 225, 235, respectively. The dividers, of any conventional design, form at their respective output terminals signals proportional to the quotients of the signals developed in the upper subpaths divided by the signals developed in the corresponding lower subpaths. Thus the signals formed at the output terminals of dividers 215, 225, 235 are proportional to the equalized formants $$\tilde{g}_1(t)=\frac{g_1(t)}{\overline{|g_1(t)|}^{\frac{1}{2}}},\tilde{g}_2(t)=\frac{g_2(t)}{\overline{|g_2(t)|}^{\frac{1}{2}}},\tilde{g}_3(t)=\frac{g_3(t)}{\overline{|g_3(t)|}^{\frac{1}{2}}}$$

respectively.

In accordance with Equation 6, the output signals of dividers 215, 225, 235, are linearly combined in adder 240, of any suitable design, which forms at its output terminal an equalized speech wave $\tilde{g}(t)$ suitable for narrow-band transmission by a well-known autocorrelation vocoder 250; for example, autocorrelation vocoder 250 may be of the type described in the above-mentioned M.I.T. Quarterly Progress Reports. Vocoder 250 transmits the equalized speech wave $\tilde{g}(t)$ from the analyzer terminal 251 to the synthesizer terminal 253 via transmission medium 252 in the form of low-frequency control signals representative of the autocorrelation function $\tilde{\varphi}(t)$ of the equalized speech wave. From Equations 13 and 14 the amplitude spectrum of $\tilde{\varphi}(t)$ has the same general shape as the amplitude spectrum of the original speech wave; thus vocoder 250 produces at its output terminal artificial speech which is free of distortion due to amplitude spectrum squaring.

From Equation 18 it is apparent that the apparatus of FIG. 2 is not limited to situations in which the amplitude spectrum of the transmitted wave is to be raised to a power of two, but that the apparatus may be easily modified to adapt it to situations in which the amplitude spectrum of a transmitted wave is to be raised to a power $n$. In the case of a power $n$, as illustrated by FIG. 3, the square-root-taking devices 214, 224, 234 of FIG. 2 are replaced by devices 314, 324, 334, of any well-known construction, which take the $$\left(1-\frac{1}{n}\right)\text{th}$$

root of each of the average absolute formant amplitudes, in accordance with Equation 18. If desired, $$\left(1-\frac{1}{n}\right)\text{th}$$

root-taking devices 314, 324, and 334 may be well-known circuits of the type described on page 81 of the previously cited Analog Methods reference; that is, each of the devices 314, 324, and 334 is a circuit which generates an output signal that is proportional to the $$\left(1-\frac{1}{n}\right)\text{th}$$

root of the incoming rectified and averaged formant signal. From Equation 17, subsequent operations which raise the amplitude spectrum of the equalized speech wave appearing at the output terminal of adder 340 to a power $n$ produce an amplitude spectrum whose exponent is unity, thereby preserving in the amplitude spectrum of the artificial speech wave the general shape of the amplitude spectrum of the original speech wave.

It is to be understood that the above-described arrangements are merely illustrative of applications of the principles of the invention. Numerous other arrangements may be devised by those skilled in the art without departing from the spirit and scope of the invention.

What is claimed is:

1. In a speech transmission system the combination that comprises a source of an incoming speech wave, means for obtaining a group of signals representative of the formants of said speech wave, means for selectively modifying the magnitudes of said formant signals by dividing each of said formant signals by the square root of its average absolute magnitude, means for combining said selectively modified formant signals to form an equalized speech wave, an autocorrelation vocoder comprising an analyzer terminal, a narrow-band transmission channel, and a synthesizer terminal, and means for applying said equalized speech wave to the analyzer terminal of said autocorrelation vocoder.

2. Apparatus for the narrow-band transmission of speech which comprises a source of an incoming speech wave, means for deriving a group of signals representative of the peaks of the amplitude spectrum of said speech wave, means for reducing the magnitudes of said peak signals by dividing each signal by the square root of its average absolute magnitude, means for linearly combining said reduced magnitude signals to form an equalized speech wave, means for correlating said equalized speech wave with itself to obtain a group of narrow-band control signals, means for transmitting said narrow-band control signals to a receiver station, and at said receiver station, means for reconstructing an artificial speech wave from said narrow-band control signals.

3. Apparatus for equalizing an incoming speech wave before transmission to prevent distortion due to raising the speech amplitude spectrum to a power $n$ during the course of transmission which comprises a source of an incoming speech wave, means for deriving a set of signals representative of the formants of said speech wave, means for reducing the magnitudes of said formant signals by dividing each signal by the $$\left(1-\frac{1}{n}\right)\text{th}$$

root of its average absolute magnitude, and means for combining said reduced magnitude formant signals to form an equalized speech wave.

4. In an autocorrelation vocoder system the combination that comprises a source of an incoming speech wave, means for obtaining a group of signals representative of the formants of said speech wave, means for decreasing the magnitudes of said formant signals, including a plurality of upper subpaths paired with a plurality of lower subpaths, wherein each of said pairs of subpaths is supplied with one of said formant signals, each of said upper subpaths contains a delay element and an output terminal, and each of said lower subpaths contains a rectifier, a low-pass filter, a root-taking device and an output terminal, a plurality of dividing means, each having two input terminals and an output terminal, in one-to-one correspondence with each of said pairs of subpaths, means for connecting the output terminal of each of said upper subpaths to an input terminal of its corresponding dividing means, and means for connecting the output terminal of each of said lower subpaths to an input terminal of its corresponding dividing means, means for combining said reduced magnitude formant signals to form an equalized speech wave including an adder having a plurality of input points, one for each of said dividing means, and one output point, and means for connecting the output terminals of said dividing means to the input points of said adder, means connected to the output point of said adder for obtaining a set of control signals representative of the autocorrelation function of said equalized speech wave, means for transmitting said control signals to a receiver station, and at said receiver station, means for synthesizing an artificial speech wave from said control signals.

5. Apparatus for equalizing an incoming speech wave before transmission to prevent distortion due to squaring the speech amplitude spectrum during the course of transmission which comprises a source of an incoming speech wave, means for deriving from said speech wave a plurality of signals each of which is representative of one of the formants of said speech wave, means for dividing each of said formant signals by the square root of its average absolute magnitude, and means for combining said divided formant signals to form an equalized speech wave.

References Cited in the file of this patent

UNITED STATES PATENTS

| | | |
|---|---|---|
| 2,819,341 | Barney | Jan. 7, 1958 |
| 2,857,465 | Schroeder | Oct. 21, 1958 |